United States Patent [19]
Monroe

[11] 3,866,238
[45] Feb. 11, 1975

[54] LASER DIODE FOR USE WITH FILM MEMORY SYSTEM

[75] Inventor: Marvin E. Monroe, Columbus, Ohio

[73] Assignee: North Electric Company, Galion, Ohio

[22] Filed: June 1, 1973

[21] Appl. No.: 366,180

[52] U.S. Cl............ 346/76 L, 29/578, 331/94.5 H, 340/173 LM
[51] Int. Cl. ............................................ G11b 7/00
[58] Field of Search .................... 346/76 L, 108; 179/100.3 Z; 317/235; 29/578, 584, 569 L; 340/173 LM, 173 LT; 331/94.5 H

[56] References Cited
UNITED STATES PATENTS

| | | | |
|---|---|---|---|
| 3,522,388 | 7/1970 | Miller | 179/100.3 Z |
| 3,522,389 | 7/1970 | Bumiller | 179/100.3 Z |
| 3,720,784 | 3/1973 | Maydan et al. | 346/76 L X |

*Primary Examiner*—Joseph W. Hartary

[57] ABSTRACT

A laser diode for use in writing and reading information into and from film memory systems, which diode has a mask disposed over the light output face which is of a material which is opaque to the wavelength of the light output from the laser diode, and an aperture in the mask having at least one dimension which is determined by a corresponding dimension of the beam output by the diode in the stimulated light mode, and the method of making same.

6 Claims, 3 Drawing Figures

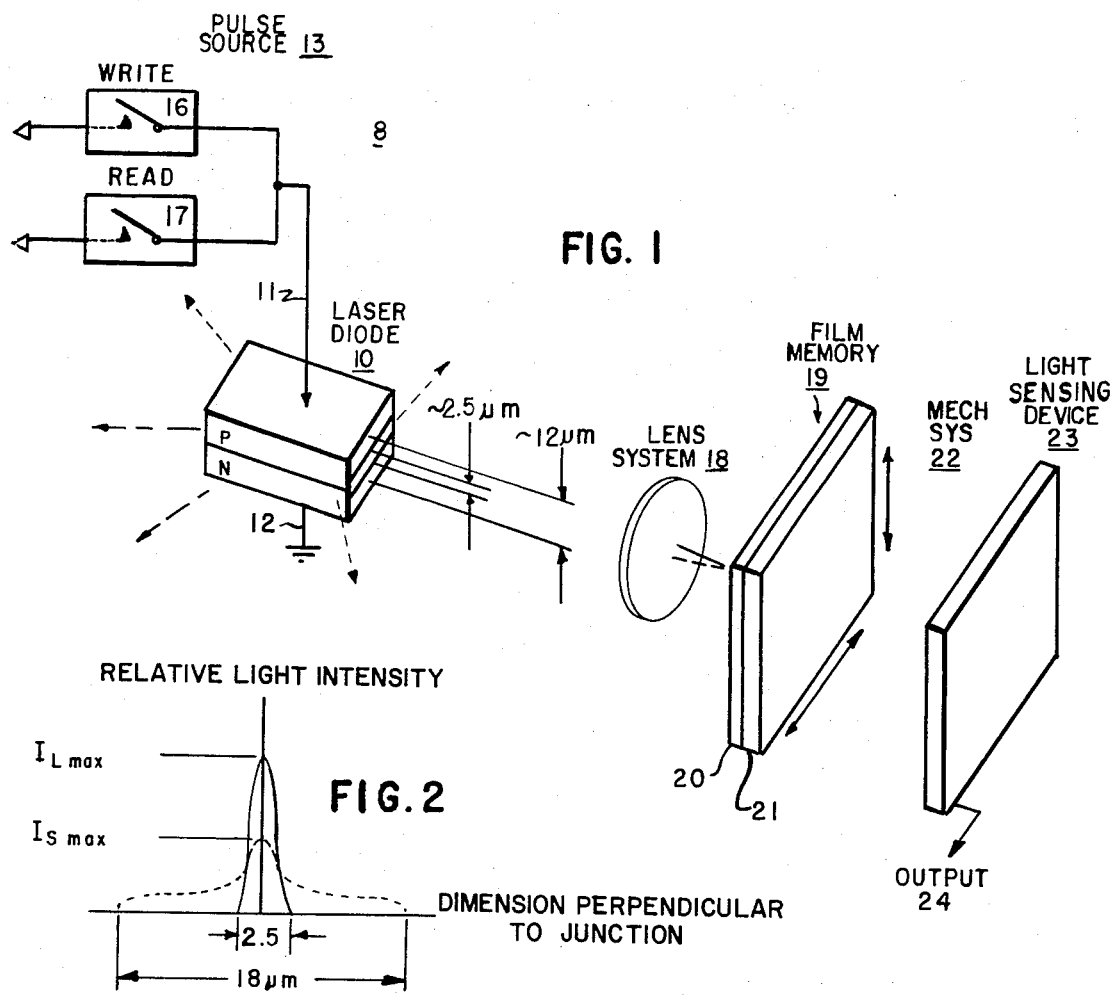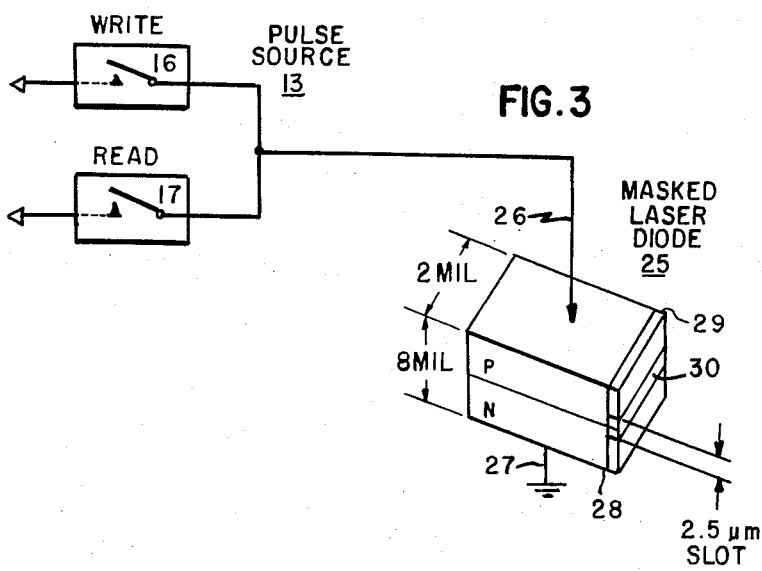

LASER DIODE FOR USE WITH FILM MEMORY SYSTEM

BACKGROUND OF THE INVENTION

This invention relates to a laser diode for use in film memory systems, and to a novel method of manufacturing a laser diode for such use. The invention is specifically directed to an improved laser diode for use in the writing of information on, and the reading of information from, a film memory.

It has been known that images can be recorded on a metallic film such as bismuth, which is formed on a transparent substrate, such as mylar or glass, by using an amplitude modulated laser beam to "machine" or write information on the metallic film. If, for example, one bit or form of information is to be stored at a selected position on the film, the beam is turned on and the thermo-energy of the beam dissipated in the film causes a local displacement or removal of the metallic material at such position. If the beam is not turned on at such position, the metallic material is left undisturbed. By using conventional scanning techniques, the modulated laser beam may be moved to different positions on the film, and by modulating the beam as moved to the different positions in the scan, a permanent image or record can be stored on the film.

In the earlier systems of this type, large amounts of laser power were required, and limited resolution was obtained. In a recent development which is described in the Bell Systems Technical Journal of July–August 1971, Page 176, a bismuth film deposited on a glass or mylar substrate was pulsed with a low order gas laser to record an image in the form of an array of discrete holes in the metal film,. Each laser pulse served to machine a single, nearly circular hole in the metal film by displacing and removing the metal from the transparent substrate, the size of the hole being determined by the degree of beam modulation effected at each position on the film. The resultant image formed on the metal film constitutes a transparency which can be displayed or projected on a screen by directing an incandescent light therethrough in known manner.

In such arrangement, the average laser power required to displace or remove a given amount of metal per unit time was significantly reduced by use of the pulsing technique. Further, the area of the transparent spots machined in the film was varied in a nearly linear fashion with the pulse height to provide a gray scale along with the black and white scale.

In yet another mode of operation, a laser diode is used to store data bits at different positions (or cells) on a memory film during a write mode of operation, and the same diode is used to retrieve such information in a subsequent readout mode. Pulse means associated with the laser diode are selectively controlled to register data bits in the memory cells during the writing mode. If the laser diode is pulsed during the selection of a cell for write purposes, the laser beam causes a displacement of the film at such cell, and the resultant aperture in the film at such cell represents storage of a logic 1 bit in the cell. Alternatively if the diode is not pulsed at the time of selection of such cell for write purposes, the film material remains undisturbed at such position, and a logic 0 stored in the cell. Thus by turning the beam on or off as each of the different cells is selected for write purposes, it is possible to permanently store logic 1 and logic 0 bit information on the film.

In the read mode, the same laser diode is energized at a lower level to selectively retrieve the bit information from the cells on the memory film. That is, as a cell is selected for readout the beam output of the diode strikes such cell, and if a logic 1 bit is stored in such cell, the beam will pass through the aperture in such cell and associated light sensing means on the opposite side of the film will provide an output signal to indicate a logic 1 bit is stored in such cell. If a logic 0 bit is stored in such cell, the opaque film will block passage of the light beam through the film and the signal output of the light sensing means will indicate that a logic 0 bit is stored in such cell.

In such systems, there are limitations as to the density of the number of information bits which may be placed on the memory film. That is, it has been found that with the enabling of the laser diode by the lower current for read purposes, the light output of the diode is incoherent and tends to emamate from a somewhat larger area than when the laser diode is energized by the larger value current used in the write mode. To insure integrity of readout of the information from each cell, it was found necessary to maintain a minimum distance between centers of the respective cells on the film at which information may be stored, which distance in one embodiment was in the order of or greater than 24 microns. Since the pertinent dimension of the write beam image was in the order of 6$\mu$m, it is seen that the use of a different source image size for read and write purposes results in a serious limitation as to the density of the bit information which can be stored on the film memory.

SUMMARY OF THE INVENTION

The present invention is directed to a laser diode for use in the reading and writing of information from a film memory which permits an increased storage density on the film; and a novel method of making the same.

The novel laser diode provided herein comprises a laser diode having a film mask which overlies the light output face of the laser diode, which mask is of a material which is opaque to the wavelength of the light output of the laser diode, and which has an aperture or slot having at least one dimension and location which is related to and determined by the dimension of the beam output in the write or stimulated mode of the laser diode. As will be shown in the case of a slot aperture, one or both dimensions may be determined by the beam dimensions, and in the case of a circular beam one dimension (i.e., the diameter of the circular aperture) is determined by the beam diameter.

With the energization of the laser diode in the read or spontaneous mode, the mask restricts the dimension or dimensions of the beam size in the stimulated mode. As a result, the cells on the film memory can be located relatively closer to one another, and a correspondingly larger number of bits may be stored thereon.

There is also disclosed herein a novel method for making a laser diode for such use which comprises the step of coating the output face of a laser diode with a material of sufficient optical density to create a layer which is opaque to the wavelength of the light generated by the laser diode, and applying a current to the laser diode producing an optical output of a value sufficient to displace the film from such face over an area which is related to and determined by at least one dimension of the beam output from the laser diode in response to the current applied.

DESCRIPTION OF THE DRAWINGS

With reference to the drawings,

FIG. 1 is a perspective view of an optical memory system which uses a conventional laser diode;

FIG. 2 is a graphic representation of the relative outputs of light generated by a conventional laser diode in the spontaneous emission and stimulated emission modes respectively; and FIG. 3 is a showing of a novel diode for use in an optical memory system.

GENERAL DESCRIPTION

There is shown in FIG. 1, a system 8 which is operative to provide permanent storage of bit information on a metallic film, and which is also selectively operative to retrieve the stored bit information from such film. As there shown, the system includes a laser diode which may be a conventional gallium arsenide diode 10. First and second terminals 11, 12 on the diode are connected to a pulse source 13, which source is shown schematically in FIG. 1. The pulse source 13 includes a first or write switch 16 which is operative in the write mode to provide a 10 amp pulse of approximately 200 nanoseconds to terminals 11, 12 each time switch 16 is closed, and a second or read switch 17 which is operative in the read mode to provide a current of approximately 50 milliamps to the terminals 11, 12. The actual current value if below the laser threshold is not critical. As will become apparent, the period of energization of the read switch is likewise not critical, and the read switch may actually be closed to provide the 50 milliamp current to the diode 10 during the period that readout of any or all the memory cells is effected.

With the closure of switch 16 to apply a 200 nanosecond write pulse to terminals 11, 12 in the so-called stimulated emission mode, a light beam is output from laser diode 16 which has a wavelenght of approximately $0.9\mu m$ and a beam dimension which measures in the order of $2.5\mu m$ as measured in a direction perpendicular to the junction of the diode. The width of the beam is determined by adjustment of the current distribution through the laser which in a typical embodiment may be in the order of 2 mils. If desired, the beam width may also be restricted to such value by using a laser which has a physical width of approximately 2 mils.

During the period the read switch 17 is operated, the laser diode 10 provides a light output in the so-called spontaneous emission mode which is incoherent and may be characterized by glowing of the entire junction region of the diode with no preferential direction of propagation. Such light output is represented by the dotted lines in FIG. 1. The dimension of the light output from the light face of diode 10 represented by the upper and lower solid lines in FIG. 1 will normally extend in excess of $12\mu m$ when measured in a direction perpendicular to the diode junction. Such value will of course vary with diode fabrication techniques.

The laser diode 10 may be used inter alia, with a memory film system of the type disclosed in the above identified Bell Systems Technical Journal and schematically shown in FIG. 1. As there shown, a lens system 18 is effective to focus the beam output of the laser diode 10 on a film memory 19 which may comprise a 600 Angstrom thick bismuth film 20 deposited on the mylar glass substrate 21.

Suitable mechanical means 22 may be provided as taught in such reference to effect relative movement of the memory 19 and the output of the lens system 18 as shown by the arrows in FIG. 1, whereby different points or cells on the film 20 of memory 19 are selectively brought into registration with the focused beam output of the lens system 18. Movement of the memory film plane 19 relative to the focused beam output from lens system 18 may also be effected for example by locating the memory film 19 on a rotating disc, whereby with disc rotation the beam output from lens system 18 is caused to sweep across the face of the memory 19 and thereby bring the beam into registration with correspondingly different cells on the film 20.

As the beam output of the lens system 18 and different points or cells on the film 20 are selectively moved into registration during the write mode, write switch 16 is selectively operated to store either a logic 1 or logic 0 bit at each such cell. If a logic 1 bit is to be stored at a selected position on the film 20, the write switch 16 is closed for a 200 nanosecond period and a 10 amp current pulse is fed to the diode terminals 11, 12. With the application of such pulse, the stimulated emission light out put of the laser diode 10 is focused by lens system 18 on such cell to cause the metallic film 20 at such position to be displaced or removed, and thereby effect the permanent storage of a logic 1 at such position. Alternatively, if write switch 16 is not closed, laser diode 10 will not provide a light output, and the film 20 at such point will not be disturbed, whereby a logic 0 is registered at such position on the film 20.

It is seen therefore that as a relative movement is effected between the output of lens system 18 and memory 19 by the mechanical system 22 to move different cells into the write position, bit information comprised of logic 1, logic 0 bits may be stored in the different cells by means of the write switch 16.

Subsequent readout of the information which is thus stored on the memory 19 is effected by the same laser diode 10 with the read switch 17 in the closed position. As noted above, as the read switch 17 closes to connect 50 milliamps current to diode 10, the diode provides a spontaneous light output which is directed by lens system 18 to the one of the cells on the memory 19 selected by the mechanical system 22.

As the light output of the lens system 18 during readout is brought into registration with a selected cell on the memory 19, the focused light beam output from lens system 18 will either be blocked by the film at such point (i.e., if logic 0 bit is stored), or will be directed through the hole on the film memory (i.e., if a logic 1 bit is stored) to an associated light sensitive device 23. The light sensitive circuit 23 may comprise a conventional photocell which responds to the presence and absence of light respectively on the side of the memory 19 opposite to the side which faces the lens system 18. The photocell in known manner responsively provides a logic 1 or a logic 0 over an associated output circuit to associated equipment.

As noted above, the stimulated emission light output from the laser diode 10 during the write mode may be characterized by a source area of emission which is relatively confined to the plane of the junction of the diode. During the read mode, that is, when the lower values of current are applied to the laser diode 10, a spontaneous light output occurs which may be characterized by a glowing of the entire junction area with no preferential direction of propagation as indicated by the dotted lines in FIG. 1.

With reference to FIG. 2, the typical light output from the light output face of a conventional diode 10 of the gallium arsenide type during the period of stimulated emission is graphically shown as being in the order of 2.5μm when measured in a direction perpendicular to the diode junction. The area of light generated by the laser diode 10 during the read mode which in addition to being multidirectional is shown as typically comprising a light output of 18μm when measured in a direction perpendicular to the diode junction, and in the order of 2 mil along the diode junction. Such value will vary with diode fabrication techniques. In addition, the lens system employed may cause image spreading which results in a stimulated emission image in the order of 6μm in a direction perpendicular to the diode junction, and a spontaneous emission image approximately 21μm in the same direction.

It is seen therefrom that in a system, such as shown in FIG. 1, in which the same laser diode is to be used in both the write and read modes, it is necessary to space the positions or cells on the film 20 more widely than if the film is used solely for write purposes. That is, each position must be separated from the adjacent position sufficiently to prevent the light output provided by the laser diode 10 from impinging on more than one cell at a time. Since the light output from the laser diode 10 in the read mode image is measurable in one dimension over at least a 21μm area, the centers of adjacent spots on the film 20 were necessarily in the order of at least 24 microns between centers, whereas if the laser diode 10 were used for write purposes only, the position between centers could be reduced to approximately 8μm. Thus the use of a laser diode for both the read and write modes results in a corresponding limitation of the bit density, i.e., the number of bits which may be stored on a given size memory film.

DESCRIPTION OF PREFERRED EMBODIMENT

With reference to FIG. 3, there is shown thereat a laser diode 25 which according to the present invention may be used with the system of the type shown in FIG. 1 to provide a light output to the lens system 18, which output comprises a light beam of substantially the same dimensions in both the read and write modes, whereby the centers of the adjacent cells on the film 20 may be moved closer to one another, and an increased density of bit storage is provided on the film 20.

More specifically, the light output face 28 of diode 25 is coated or masked with a film of material 29 which has sufficient optical density to create an opaque layer for the 0.9μm wavelength light output of the diode 25. In a preferred embodiment, the diode 25 may comprise a gallium arsenide laser diode which is one embodiment is 2 mils wide × 16 mils long × 8 mils high, and which has a bismuth film 28 applied to the light output surface 28 thereof by vacuum deposition or sputtering to a thickness of approximately 300 Angstroms.

Film coatings of other material may be used, subject to the constraint, however, that the optical energy density required to remove the coating material 29 to provide the desired aperture does not exceed the damage threshold of the laser diode 25.

Similarly, further layers may be used with the mask layer on the light output surface of the diode. Thus intervening layers may be deposited between the light output surface of the laser diode 25 and the mask layer 29 for electrical insulation and/or antireflection purposes without altering the scope of the invention.

The mask 29 locates an aperture or slot 30 at the point of light output of the laser diode 25 when energized in the stimulated emission mode, which aperture has either one or both dimensions determined by and related to the size of the beam in such mode. Such aperture 30 is provided by connecting input terminals 26, 27 of laser diode 25 to pulse source 13, and closing write switch 16 to apply a 200 nanosecond pulse of approximately 10 amps to the diode 25. As a result of the applied write pulse, area 30 is burned or displaced from the bismuth film 29 on the light output face 28 of the laser diode 25, which area corresponds to the size of the beam output (a vertical dimension approximately 2.5 μm and a horizontal dimension of approximately 2 mil) by the laser diode junction when operated in the stimulated emission mode.

It will be apparent that with the diode thus processed, the 0.9 μm light output from surface 28 of the laser diode 25 is now completely masked by the film 29 except for the area 30 which is burned in the mask 29 (i.e., 2.5 μm by 2 mil). While no change in the light output from surface 28 of the laser diode 24 occurs when the diode is now energized in the write mode (i.e., a 2.5 μm by 2 mil beam as before) the mask 29 will effectively reduce the area of light output from surface 28 during the energization of the laser diode 25 in the read mode to the same dimensional output of 2.5 μm by 2 mil which is experienced in the write mode of the laser diode 25.

Since the area of the light output of the laser diode during the read (or spontaneous emission mode) is now substantially the same as the beam dimension which is provided by laser diode 25 during the write (or stimulated emission) mode, the cells on the film memory may be moved closer to one another. That is, the beam dimensions during the read mode have been reduced from 18 μm (or more) by 2 mil to approximately 2.5 μm by 2 mil, and accordingly there is no need to maintain the cells center spaced at the larger distances previously required. Reducing the distance between the centers of the cells on the film 20 achieves a correspondingly increased bit storage density for the memory 19.

It has been found in using such techniques that the width of the bits as stored on the memory film were in the order of 3 μm, and that the distance between centers could be reduced to approximately 8 μm. Such change in effect results in an improvement by a factor of 3 over the previous arrangement, wherein it was necessary to maintain a spacing of approximately 24 microns between centers of adjacent bits.

In the foregoing description of the embodiment of FIG. 3 the laser was described as having a width in the order of 2 mils and accordingly the beam width output from the laser in such embodiment is determined by the physical width of the laser (i.e., 2 mils). It has been determined however that a beam width in the order of 2 mils may also be obtained in a laser having a physical width of a larger dimension by proper control of the current distribution applied to the laser, whereby both dimensions of the mask aperture rather than one are determined by the beam dimensions.

It is of course apparent that while the specific embodiment illustrates the invention as used with a laser diode, the same invention may be used with other lasers without departing from the teaching of the disclosure.

By way of example, in the use of the invention with a gas laser, the beam output may be of a circular configuration and the diameter of the circular aperture in the mask will be that of the diameter of the beam output of the gas laser.

I claim:

1. In a memory system using film for the storage of information, the improvement comprising a laser having a light output face, a mask disposed over said light output face including a light emitting area having at least one dimension which is formed in the mask by the beam output from said laser in the stimulated light mode, said mask being of a material which is opaque to the wavelength of light output from said laser and which is displaceable by the beam output of the laser in the stimulated light mode, whereby an emitted light beam of substantially the same dimension is provided in both the spontaneous and stimulated light modes of the laser.

2. In a system as set forth in claim 1 in which said laser is a gallium arsenide diode, and in which said mask comprises bismuth deposited on the output face of such diode.

3. In a system as set forth in claim 1 in which said area is of a rectangular form and in which one dimension is formed by the corresponding dimension of the beam and the second dimension is determined by a physical dimension of the laser.

4. In a system as set forth in claim 1 in which said beam output is of a circular configuration, and said area in said mask is of a circular configuration.

5. In a system as set forth in claim 1 in which the light emitting area comprises a slot, and one dimension of said slot in said mask which is determined by said beam dimension is in the order of 2½ microns.

6. In a memory system as set forth in claim 1 in which the characteristics of the mask material are such as to respond to an energy density which is less than that which exceeds the damage threshold of said laser.

* * * * *